US011948539B1

(12) United States Patent
Sears

(10) Patent No.: US 11,948,539 B1
(45) Date of Patent: Apr. 2, 2024

(54) VIOLIN BOW TIP INSERT AND BOW RE-HAIRING SYSTEM

(71) Applicant: Zachary C Sears, Vancouver, WA (US)

(72) Inventor: Zachary C Sears, Vancouver, WA (US)

( * ) Notice: Subject to any disclaimer, the term of this patent is extended or adjusted under 35 U.S.C. 154(b) by 0 days.

(21) Appl. No.: 18/370,987

(22) Filed: Sep. 21, 2023

(51) Int. Cl.
*G10D 3/16* (2020.01)

(52) U.S. Cl.
CPC .................................... *G10D 3/16* (2013.01)

(58) Field of Classification Search
CPC ........................................................ G10D 3/16
See application file for complete search history.

(56) References Cited

U.S. PATENT DOCUMENTS

| | | | | | |
|---|---|---|---|---|---|
| 425,503 | A * | 4/1890 | Glass | G10D 3/16 | 84/282 |
| 738,945 | A * | 9/1903 | Roark | G10D 3/16 | 84/282 |
| 1,151,413 | A * | 8/1915 | Steckenreiter | G10D 3/16 | 84/282 |
| 1,427,851 | A * | 9/1922 | Rigg | G10D 3/16 | 984/122 |
| 1,566,914 | A * | 12/1925 | Newman | G10D 3/16 | 984/122 |
| 1,646,118 | A * | 10/1927 | Stadniczek | G10D 3/16 | 984/122 |
| 1,655,613 | A * | 1/1928 | Jung | G10D 3/16 | 984/122 |
| 1,912,961 | A * | 6/1933 | Lowell | G10D 3/16 | 984/122 |
| 1,971,973 | A * | 8/1934 | Buser | G10D 3/16 | 984/122 |
| 2,079,811 | A * | 5/1937 | Matha | G10D 3/16 | 984/122 |
| 2,252,929 | A * | 8/1941 | Heddon | G10D 3/16 | 984/122 |
| 2,483,486 | A * | 10/1949 | Brown | G10D 3/16 | 984/122 |
| 2,624,225 | A * | 1/1953 | Nebel | G10D 3/16 | 984/122 |
| 3,759,131 | A * | 9/1973 | Brock | G10D 3/16 | 984/122 |
| 4,020,731 | A * | 5/1977 | Darling | G10D 3/16 | 984/122 |
| 9,679,544 | B2 * | 6/2017 | Yang | G10D 3/16 | |

FOREIGN PATENT DOCUMENTS

| | | | | |
|---|---|---|---|---|
| DE | 2551619 | A * | 8/1976 | G10D 3/16 |
| GB | 296939 | A * | 2/1928 | G10D 3/16 |
| GB | 1236154 | A * | 6/1971 | G10D 3/16 |

* cited by examiner

*Primary Examiner* — Robert W Horn
(74) *Attorney, Agent, or Firm* — Plager Schack LLP; Mark H. Plager; Naomi Mann

(57) ABSTRACT

A system for re-hairing a bow of a musical instrument provides a bow tip insert configured to install into a tip cavity within a tip of the bow, wherein the bow tip insert is configured to non-permanently secure to the tip of the bow, and wherein the bow tip insert is further configured to affix bow hair to the bow when the bow tip insert is installed in the tip cavity.

16 Claims, 3 Drawing Sheets

VIOLIN BOW TIP INSERT AND BOW RE-HAIRING SYSTEM

BACKGROUND

The present disclosure relates generally to bows for musical instruments, and more specifically to systems and accessories for efficient restoration of such bows.

The hairs of bows used for instruments such as violins, violas, cellos, and basses, repeatedly become worn and need replacing. Certain bows, and in particular low-cost bows used by students, may include a tip plug that supports the bow hairs, and is glued within the bow. As the tip plug is glued, it cannot be removed easily, and the cost of labor for re-hairing the bow typically exceeds the cost of a new bow. This results in such bows getting discarded. In many cases, bows used by students may be discarded about every year forcing students and/or schools to purchase new bows. As such, an improved system is desirable.

SUMMARY

According to various embodiments, disclosed is a system for re-hairing a bow of a musical instrument, which may comprise providing a bow tip insert configured to install into a tip cavity within a tip of the bow, wherein the bow tip insert is configured to non-permanently secure to the tip, and wherein the bow tip insert is configured to affix bow hair to the bow when the bow tip insert is installed within the tip cavity.

In some embodiments, the bow tip insert is configured to be non-permanently secured to the tip via a fastener. In some further embodiments, the fastener comprises a screw, wherein the bow tip insert includes a through hole configured to receive the screw, and wherein the tip includes a threaded cavity extending downwards from the tip cavity, the threaded cavity configured to threadably engage a lower portion of the screw when the screw is passed through the through hole. In certain embodiments, the system further comprises installing the bow tip insert within the tip of the bow to affix usable bow hair to the bow by inserting the bow tip insert into the tip cavity and attaching the bow tip insert to the tip via the screw. In some embodiments, the bow tip insert is configured to form a constriction against a tip cavity wall for securely trapping the hair to affix the bow hair to the bow when the bow tip insert is installed within the tip cavity. In certain embodiments, the bow tip insert includes a main body and at least one projection extending from a rear side wall of the main body, the projection configured to cooperate with a forwardly extending lip projection of the tip cavity wall to create a hair trapping constriction for securing bow hair to the bow when the bow tip insert is installed within the tip cavity. In some embodiments, the projection extends from a top edge of the main body, and the lip extends from a top edge of the tip cavity. In certain embodiments, the bow tip insert includes a main body and a slotted projection, wherein the slotted projection is configured to receive bow hair engaged through an opening in the slotted projection. In some embodiments, the bow tip insert further includes an upper projection configured to cooperate with a portion of the tip cavity wall to create a hair trapping constriction for securing bow hair to the bow when the bow tip insert is installed within the tip cavity, wherein the slotted projection is below the upper projection. In some embodiments, the system further comprises inserting an end of the bow hair through the opening in the slotted projection; inserting the tip insert into the tip cavity to wedge the hair between the upper projection and said portion of the tip cavity wall; and inserting a screw through a through hole within the tip insert and screwing an end of the screw through a threaded cavity within the tip. In some embodiments, the bow hair is knotted below the slotted projection and/or glued to the tip insert prior to inserting the tip insert into the tip cavity. In some embodiments, the system further comprises affixing the bow hair to the bow by inserting the bow tip insert into the tip cavity, wherein a first end of the hair is attached to the bow tip insert prior to inserting the bow tip insert. In certain embodiments, a second end of the hair, opposite the first end is attached to a frog, wherein the system further comprises securing the frog to an end of the bow opposite the tip, wherein the frog secured to the bow is a new frog which replaces a frog which has been removed from the bow.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
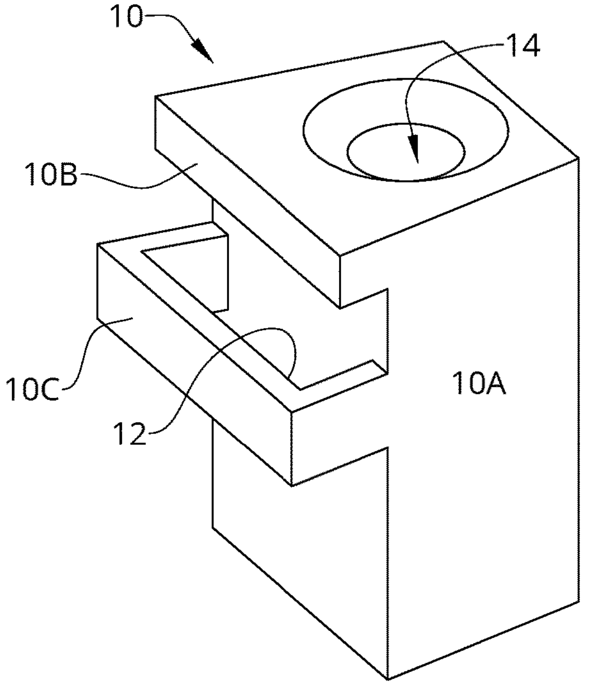
FIG. 1 is a front perspective view of a bow tip insert for a bow of a musical instrument, according to various embodiments.
Figure 2:
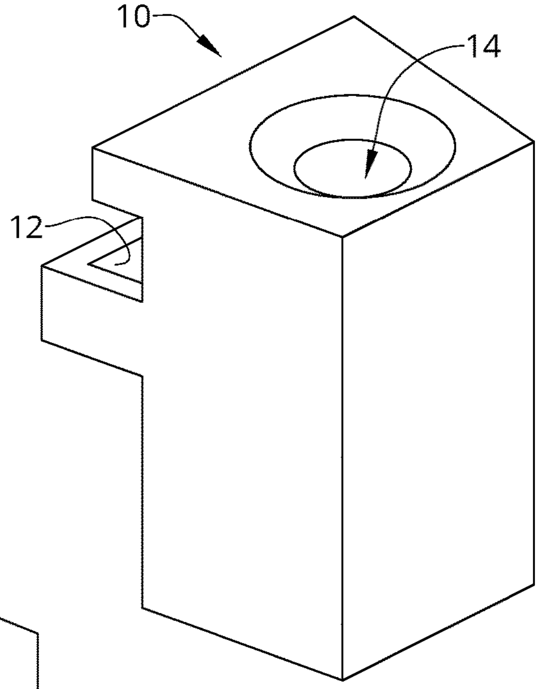
FIG. 2 is a rear perspective view of the bow tip insert of FIG. 1.
Figure 3:
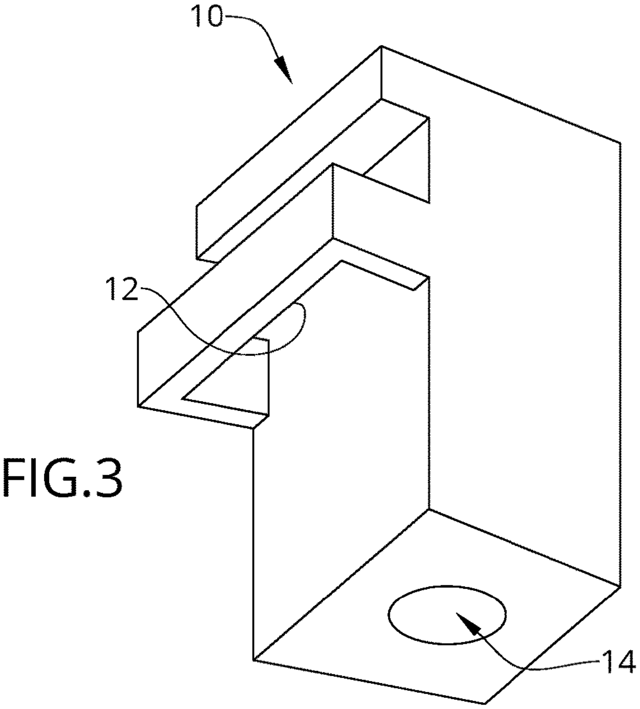
FIG. 3 is a bottom perspective view thereof.
Figure 4:
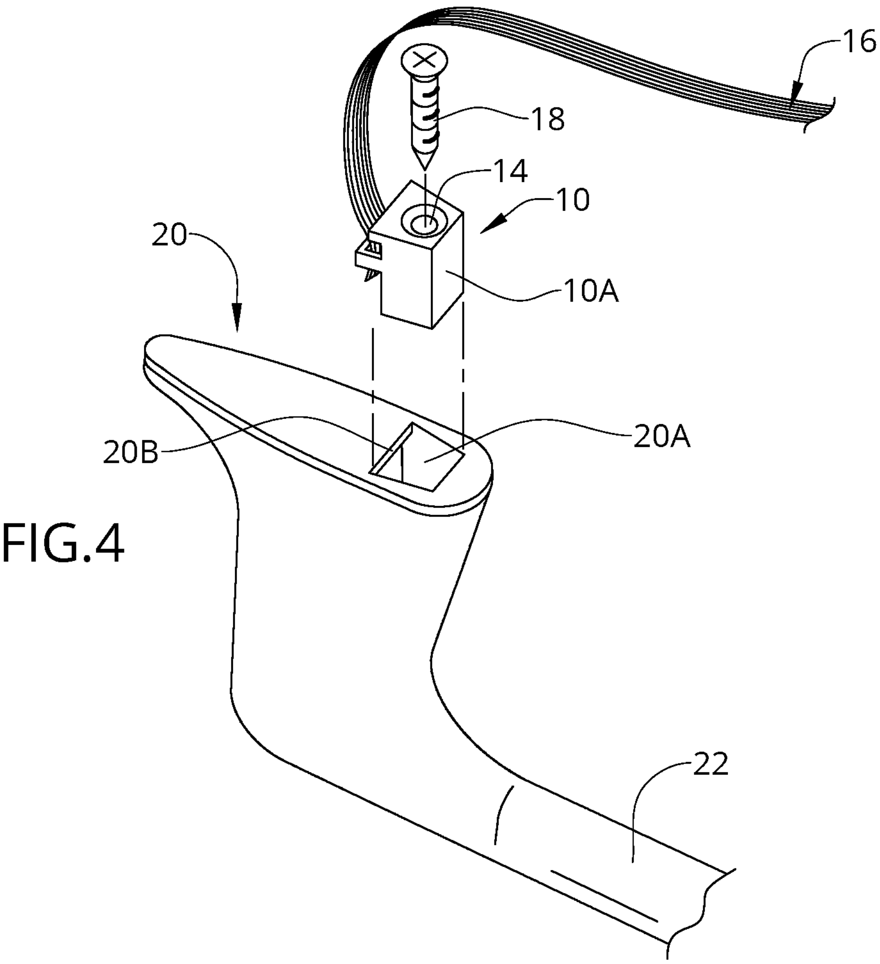
FIG. 4 is an exploded view illustrating installation of the bow tip insert into the tip cavity of a violin bow, according to various embodiments.
Figure 5:
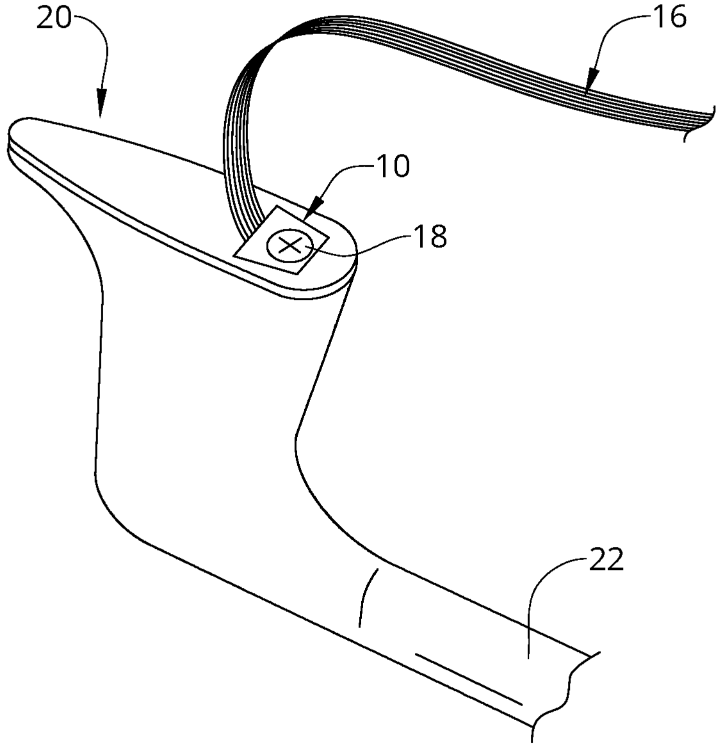
FIG. 5 is an assembled perspective view, showing the bow tip installed into the tip cavity of the violin bow.
Figure 6:
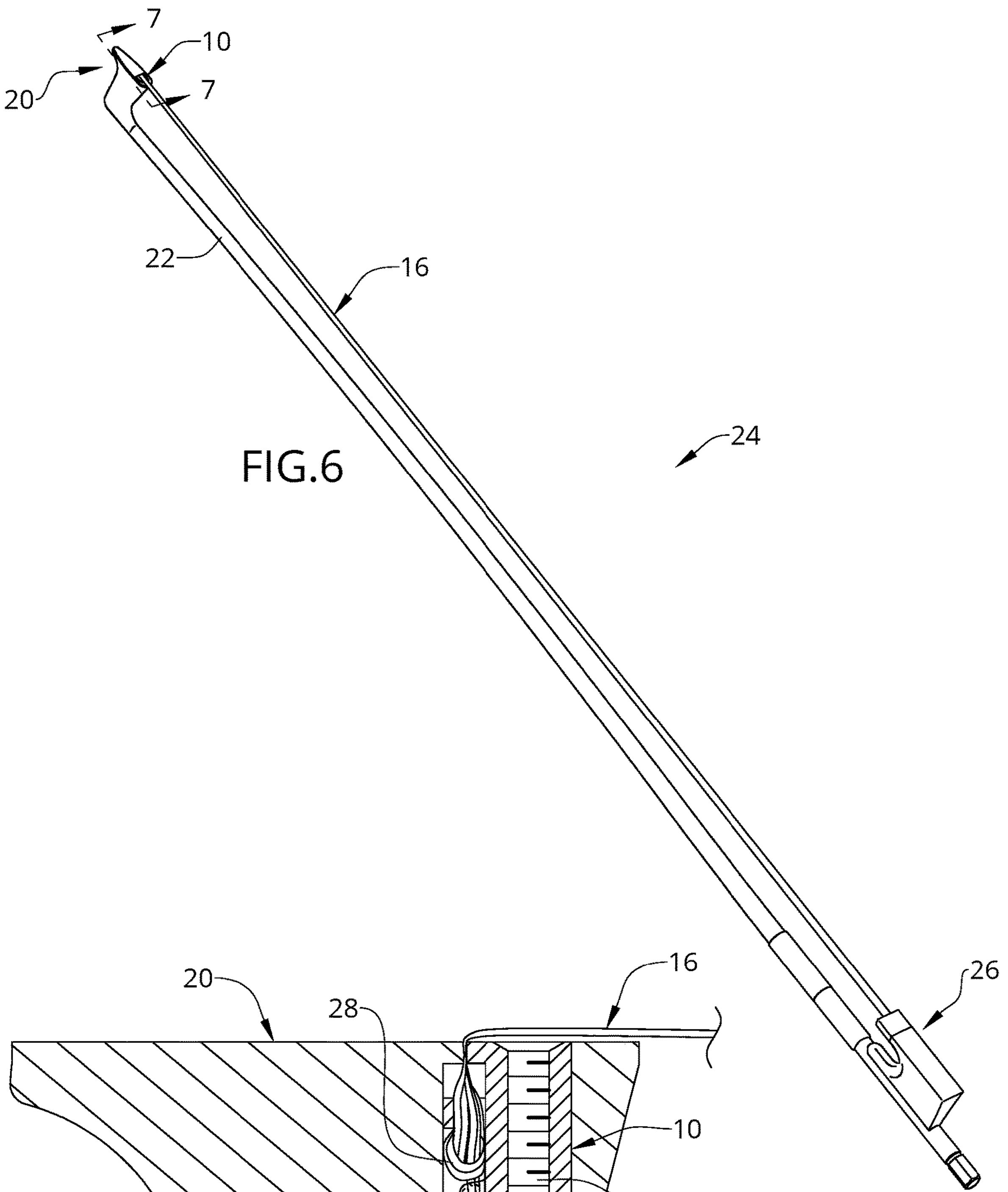
FIG. 6 is a perspective view of the entire bow with the bow tip insert installed.
Figure 7:
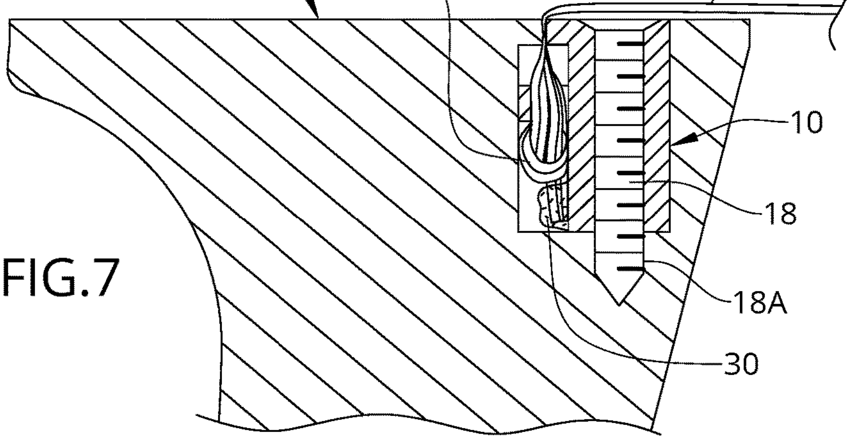
FIG. 7 is a detailed cross-sectional view of the bow tip with installed insert.

According to various embodiments as depicted in FIGS. 1-7 disclosed is a system for re-hairing a bow 24 of a musical instrument such as violin, viola, cello, bass, or the like. In embodiments, the disclosed system provides a bow tip insert 10 configured to attach to a tip 20 of an instrument bow 24 via a fastener 18 which enables the bow tip insert 10 to be taken out and replaced with a tip insert supporting new (i.e., usable) bow hair 16. In some embodiments, new bow hair 16 may be installed in the tip insert 10 which has been removed from the bow. In other embodiments, the removed insert may be entirely replaced with a new insert supporting the new bow hair. Bow 24 generally comprises a bow stick 22 with tip 20 formed at a rear end of the stick, and a frog 26 coupled to a front end of stick 22 opposite the tip, wherein both tip 20 and frog 26 project upwards with respect to bow stick 22. The bow hair is secured at its opposite ends to the tip and frog, and is held stretched out over the bow stick, as is known in the art. In some embodiments, the disclosed system may provide a bow tip insert 10 which is specifically designed to insert into one or more types of commercially available bows. In other embodiments, the disclosed system may provide a specifically designed bow configured to receive bow tip insert 10.

In certain embodiments, bow tip insert 10 includes a main body 10A configured to insert into a tip cavity 20A within bow tip 20. In one embodiment, as depicted in the figures, main body 10A and tip cavity 20A may both have corresponding trapezoidal cross-sections, but not necessarily so. According to various embodiments, bow tip insert 10 is configured to securely retain bow hair 16 when installed into tip cavity 20A. To this end, and in accordance with certain embodiments, bow tip insert 10 may be configured to cooperate with a wall and/or edge forming tip cavity 20A to provide a constriction that traps bow hair 16. In one embodiment, bow tip insert 10 includes at least one projection 10B (also referred to as "first projection") extending from a rear side wall of main body 10A configured to cooperate with a forwardly extending lip 20B of a front wall of tip cavity 20A to create a hair trapping constriction for bow hair 16. In one embodiment, first projection 10B extends from a top edge of main body 10A, and lip 20B likewise extends from a top edge of tip cavity 20A. In some further embodiments, bow tip insert 10 may also include a second projection 10C, which also extends from the rear side wall of main body 10A and is below first projection 10B. In certain embodiments, second projection 10C may include an opening or slot 12 through which hair 16 may be inserted. In some embodiments, second projection 10C (also referred to as "slotted projection") may extend out farther than upper projection 10B, but not necessarily so. As such, hair 16 may be engaged through slot 12, and is held in place between first projection 10B and lip 20B when bow tip insert is installed into tip cavity 20A of the bow tip. In some embodiments, a knot 28 may be made within a portion of the hair below slot 12 and/or glue 30 may be applied to adhere hair 16 to tip insert 10 for added holding strength.

In certain embodiments, insert 10 is configured to non-permanently attach to bow tip 20. To this end, and in accordance with certain embodiments, a fastener receiving through hole 14 may be provided within tip insert 10. Faster 18 (i.e., screw) received through hole 14 may extend below through hole 14, to screw into a portion of bow tip 20 situated below through hole 14. In some embodiments, a threaded cavity 18A may be provided within bow tip 20 for receiving the fastener. In some embodiments, hole 14 may also be internally threaded for engagement with fastener 18.

In embodiments, re-hairing bow 24 may comprise inserting a first end of new (i.e., functional/useable) bow hair 16 through slot 12 of bow tip insert 10. In certain embodiments, a second end of bow hair 16, opposite the first end, is pre-attached to frog 26 (typically via glue). In some embodiments, frog 26 may be secured to a front end of bow stick 22 via a fastener, as is known. In some embodiments, the second end of the new bow hair 16 may be knotted below slot 12, and/or glued to the bow tip insert below the slot. It shall be understood that the new bow hair is stretched out to span an appropriate length between frog 26 and bow tip 20 upon insertion into bow tip insert 10. Bow tip insert 10 may then be inserted into cavity 20A within bow tip 20, and fastener 18 may be threaded/inserted through fastener receiving through hole 14 and into a portion of bow tip 20 below the through hole. In some embodiments, a pre-threaded cavity 18A may be provided within said portion of bow tip below the through hole for receiving the lower end of fastener 18. As such, bow hair 16 may be replaced once worn by removing (i.e., unscrewing) fastener 18 to remove bow tip insert 10, wherein the worn hair may be replaced with new hair, and the bow tip insert 10 may be reinstalled.

Thus, the disclosed subject matter provides a system for inexpensively re-hairing instrument bows without professional assistance. This may be particularly beneficial for extending the lifespan of entry level bows of violins, violas, cellos, and basses, as the bows can be economically re-haired instead of being discarded.

It shall be appreciated that tip insert 10 may be manufactured and assembled using any known techniques in the field. It shall be appreciated that tip insert 10 may comprise any alternative known materials in the field and be of any geometric configuration, size, and/or dimensions. In one embodiment, bow tip insert 10 may be made of a hardened composite material.

It shall be appreciated that the disclosed device and system can have multiple configurations in different embodiments. For example, various types of mechanisms for non-permanent attachment of the bow tip insert may be used in alternate embodiments. Such mechanisms may include, but are not limited to alternate types of fasteners, snap fit mechanisms, friction fit mechanisms, clamping devices and/or mechanisms, and the like.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for re-hairing a bow of a musical instrument, the system comprising:

providing a bow tip insert configured to install into a tip cavity within a tip of the bow, wherein the bow tip insert is configured to secure to the tip of the bow and to be removed from the tip of the bow, wherein the bow tip insert is configured to affix bow hair to the bow when the bow tip insert is installed within said tip cavity, wherein the bow tip insert is configured to form a constriction against a wall of the tip cavity for securely trapping the hair when the bow tip insert is installed within the tip cavity, wherein the bow tip insert includes a main body and a projection extending from a rear side wall of the main body, the projection being configured to cooperate with a forwardly extending lip projection of the wall of the tip cavity to create a hair trapping constriction for securing bow hair to the bow when the bow tip insert is installed within the tip cavity.

2. The method of claim 1, wherein the bow tip insert is configured to secure to the tip via a removable fastener.

3. The method of claim 2, wherein the fastener comprises a screw, wherein the bow tip insert includes a through hole configured to receive the screw, and wherein the tip includes a threaded cavity extending downwards from the tip cavity, the treaded cavity configured to threadably engage a lower portion of the screw when the screw is passed through the through hole.

4. The method of claim 3, further comprising installing the bow tip insert within the tip of the bow to affix usable bow hair to the bow by inserting the bow tip insert into the tip cavity and attaching the bow tip insert to the tip via the screw.

5. The method of claim 1, wherein the projection extends from a top edge of the main body, and lip extends from a top edge of the tip cavity.

6. The method of claim 1, wherein the musical instrument is a violin, viola, cello, or bass.

7. The method of claim 1, further comprising affixing bow hair to the bow by inserting the bow tip insert into the tip cavity, wherein a first end of the hair is attached to the bow tip insert prior to inserting the bow tip insert.

8. The method of claim 7, wherein a second end of the hair, opposite the first end is attached to a frog, the system further comprising securing the frog to an end of the bow opposite the tip.

9. A method for re-hairing a bow of a musical instrument, the system comprising:

providing a bow tip insert configured to install into a tip cavity within a tip of the bow, wherein the bow tip insert is configured to secure to the tip of the bow and to be removed from the tip of the bow, wherein the bow tip insert is configured to affix bow hair to the bow when the bow tip insert is installed within said tip cavity, wherein the bow tip insert is configured to form a constriction against a wall of the tip cavity for securely trapping the hair when the bow tip insert is installed within the tip cavity, wherein the bow tip insert includes a main body and a slotted projection, wherein the slotted projection is configured to receive bow hair engaged through an opening in the slotted projection.

10. The method of claim 9, wherein the bow tip insert further includes a primary projection configured to cooperate with a portion of the tip cavity wall to create a hair trapping constriction for securing bow hair to the bow when the bow tip insert is installed within the tip cavity, wherein the slotted projection is below the primary projection.

11. The method of claim 10, further comprising inserting an end of the bow hair through the opening in the slotted projection; inserting the tip insert into the tip cavity to wedge the hair between the primary projection and said portion of the tip cavity wall; and inserting a screw through a through hole within the tip insert and screwing an end of the screw through a threaded cavity within the tip.

12. The method of claim 11, wherein the bow hair is knotted below the slotted projection and/or glued to the tip insert prior to inserting the tip insert into the tip cavity.

13. The method of claim 9, wherein the bow tip insert is configured to secure to the tip via a removable fastener.

14. The method of claim 13, wherein the fastener comprises a screw, wherein the bow tip insert includes a through hole configured to receive the screw, and wherein the tip includes a threaded cavity extending downwards from the tip cavity, the treaded cavity configured to threadably engage a lower portion of the screw when the screw is passed through the through hole.

15. The method of claim 14, further comprising installing the bow tip insert within the tip of the bow to affix usable bow hair to the bow by inserting the bow tip insert into the tip cavity and attaching the bow tip insert to the tip via the screw.

16. The method of claim 9, wherein the musical instrument is a violin, viola, cello, or bass.

* * * * *